United States Patent
Satoh et al.

(10) Patent No.: US 10,200,649 B2
(45) Date of Patent: Feb. 5, 2019

(54) IMAGE PROCESSING DEVICE, IMAGE PROCESSING METHOD AND RECORDING MEDIUM FOR REDUCING NOISE IN IMAGE

(71) Applicant: Morpho, Inc., Tokyo (JP)

(72) Inventors: Masaki Satoh, Tokyo (JP); Shun Hirai, Tokyo (JP)

(73) Assignee: Morpho, Inc., Tokyo (JP)

( * ) Notice: Subject to any disclaimer, the term of this patent is extended or adjusted under 35 U.S.C. 154(b) by 0 days.

(21) Appl. No.: 14/768,934

(22) PCT Filed: Feb. 5, 2015

(86) PCT No.: PCT/JP2015/053278
§ 371 (c)(1),
(2) Date: Aug. 19, 2015

(87) PCT Pub. No.: WO2015/119207
PCT Pub. Date: Aug. 13, 2015

(65) Prior Publication Data
US 2016/0006978 A1    Jan. 7, 2016

(30) Foreign Application Priority Data

Feb. 7, 2014   (JP) ................................ 2014-022122

(51) Int. Cl.
*H04N 5/911* (2006.01)
*H04N 5/232* (2006.01)
(Continued)

(52) U.S. Cl.
CPC ............ *H04N 5/911* (2013.01); *G06T 5/003* (2013.01); *G06T 5/50* (2013.01); *H04N 5/23258* (2013.01);
(Continued)

(58) Field of Classification Search
CPC ........... G06T 5/002; G06T 5/50; G06T 5/003; H04N 5/23248; H04N 5/23264;
(Continued)

(56) References Cited

U.S. PATENT DOCUMENTS 4,058,836 A * 11/1977 Drewery .................. H04N 5/21
                                                        348/620
4,064,530 A * 12/1977 Kaiser .................... H04N 9/646
                                                        348/620
(Continued)

FOREIGN PATENT DOCUMENTS

CN        101262559 A     9/2008
CN        102348046 A     2/2012
(Continued)

OTHER PUBLICATIONS

International Preliminary Report on Patentability issued from the International Bureau in counterpart International application No. PCT/JP2015/053278, dated Aug. 18, 2016.
(Continued)

*Primary Examiner* — David E Harvey
(74) *Attorney, Agent, or Firm* — Sughrue Mion, PLLC

(57) ABSTRACT

An image processing device comprising: a recording unit configured to record a previous frame image input before a target frame image that is to be a processing target or an output frame image from the previous frame image; an alignment unit configured to align the target frame image with the previous frame image or with the output frame image from the previous frame image; a correction unit configured to perform a temporal correction process to correct a pixel value of the target frame image by use of a pixel value of the previous frame image or a pixel value of the output frame image from the previous frame image that has been aligned by the alignment unit, with reference to the recording unit; and a generation unit configured to generate
(Continued)

an output frame image from the target frame image by use of the target frame image corrected by the correction unit.

17 Claims, 13 Drawing Sheets

(51) Int. Cl.
    *H04N 7/01* (2006.01)
    *G06T 5/00* (2006.01)
    *G06T 5/50* (2006.01)
(52) U.S. Cl.
    CPC ....... *H04N 5/23267* (2013.01); *H04N 7/0132* (2013.01); *G06T 2207/20182* (2013.01); *G06T 2207/20201* (2013.01); *G06T 2207/20224* (2013.01)
(58) Field of Classification Search
    CPC .. H04N 5/23267; H04N 5/23254; H04N 5/21; H04N 5/911; H04N 5/0132; H04N 5/23258
    See application file for complete search history.

(56) References Cited

U.S. PATENT DOCUMENTS

| | | | | |
|---|---|---|---|---|
| 4,090,221 A * | 5/1978 | Connor | H04N 19/503 | 348/618 |
| 4,240,106 A * | 12/1980 | Michael | G06T 7/2053 | 348/621 |
| 4,242,705 A * | 12/1980 | Ebihara | H04N 5/21 | 348/620 |
| 4,296,436 A * | 10/1981 | Achiha | H04N 5/21 | 348/620 |
| 4,339,803 A * | 7/1982 | Michael | G06T 7/2053 | 348/607 |
| 4,847,909 A * | 7/1989 | Shibata | H04N 5/21 | 382/107 |
| 5,296,937 A * | 3/1994 | Nakatani | H03H 17/04 | 348/E5.078 |
| 5,384,865 A * | 1/1995 | Loveridge | G06T 5/20 | 348/620 |
| 5,963,675 A * | 10/1999 | van der Wal | G06T 1/20 | 375/E7.093 |
| 6,323,876 B1 * | 11/2001 | Rao | G06K 9/00442 | 345/634 |
| 6,567,564 B1 * | 5/2003 | van der Wal | G06T 1/20 | 375/E7.093 |
| 6,681,058 B1 * | 1/2004 | Hanna | H04N 19/23 | 375/E7.086 |
| 7,365,801 B2 * | 4/2008 | Kondo | H04N 19/51 | 348/620 |
| 7,433,540 B1 * | 10/2008 | Schuster | G06K 9/32 | 345/629 |
| 7,548,256 B2 * | 6/2009 | Pilu | H04N 5/145 | 348/208.3 |
| 7,710,498 B2 * | 5/2010 | Kondo | G06T 5/50 | 348/441 |
| 8,204,336 B2 * | 6/2012 | Nguyen | H04N 5/21 | 348/607 |
| 8,311,367 B2 * | 11/2012 | Murashita | G06T 7/20 | 348/154 |
| 8,588,551 B2 * | 11/2013 | Joshi | G06T 5/003 | 382/260 |
| 8,610,826 B2 * | 12/2013 | Wu | H04N 5/213 | 348/452 |
| 8,630,484 B2 * | 1/2014 | Ozluturk | H04N 5/23248 | 348/47 |
| 8,743,287 B2 * | 6/2014 | Zhong | H04N 5/144 | 348/619 |
| 8,810,677 B2 * | 8/2014 | Hsu | H04N 9/045 | 348/208.4 |
| 8,830,360 B1 * | 9/2014 | Burt | H04N 5/21 | 348/241 |
| 8,903,191 B2 * | 12/2014 | Nestares | G06T 5/50 | 348/607 |
| 9,338,349 B2 * | 5/2016 | Sharma | H04N 5/23229 | |
| 9,451,164 B2 * | 9/2016 | Auberger | H04N 5/23254 | |
| 2003/0122967 A1 * | 7/2003 | Kondo | H04N 5/21 | 348/607 |
| 2004/0001705 A1 * | 1/2004 | Soupliotis | H04N 5/23248 | 386/242 |
| 2005/0280739 A1 * | 12/2005 | Lin | H04N 5/144 | 348/607 |
| 2005/0285959 A1 * | 12/2005 | Nakajima | H04N 5/23293 | 348/308 |
| 2006/0232712 A1 * | 10/2006 | Zhou | H04N 5/145 | 348/701 |
| 2006/0257042 A1 * | 11/2006 | Ofek | G06T 5/005 | 382/255 |
| 2006/0269155 A1 * | 11/2006 | Tener | G06T 3/4038 | 382/243 |
| 2006/0280249 A1 * | 12/2006 | Poon | G06T 7/2013 | 375/240.16 |
| 2007/0186181 A1 * | 8/2007 | Bok, II | G06F 3/0481 | 715/779 |
| 2007/0297694 A1 * | 12/2007 | Kurata | H04N 5/23254 | 382/284 |
| 2008/0002063 A1 * | 1/2008 | Kimura | G06T 5/50 | 348/607 |
| 2008/0292185 A1 * | 11/2008 | Kimura | H04N 5/21 | 382/172 |
| 2009/0180704 A1 * | 7/2009 | Wey | G06T 5/50 | 382/254 |
| 2009/0213234 A1 * | 8/2009 | Chen | H04N 5/23248 | 348/208.4 |
| 2010/0165122 A1 * | 7/2010 | Castorina | H04N 5/23248 | 348/208.4 |
| 2010/0165206 A1 * | 7/2010 | Nestares | G06T 5/50 | 348/607 |
| 2010/0220222 A1 * | 9/2010 | Naito | H04N 5/217 | 348/241 |
| 2010/0271495 A1 * | 10/2010 | Tamura | G06T 5/003 | 348/208.4 |
| 2010/0309378 A1 * | 12/2010 | Zhong | G06K 9/40 | 348/607 |
| 2011/0019082 A1 * | 1/2011 | Su | G06T 5/002 | 348/441 |
| 2011/0069906 A1 * | 3/2011 | Park | G06T 5/50 | 382/284 |
| 2012/0169892 A1 * | 7/2012 | Numata | H04N 5/23254 | 348/208.4 |
| 2012/0169894 A1 * | 7/2012 | Numata | H04N 5/3572 | 348/208.99 |
| 2013/0093906 A1 * | 4/2013 | Carlsson | H04N 5/23258 | 348/208.99 |
| 2013/0107064 A1 * | 5/2013 | Venkatraman | H04N 5/23258 | 348/208.2 |
| 2014/0003735 A1 | 1/2014 | Artyomov et al. | | |
| 2014/0044366 A1 * | 2/2014 | Yamaguchi | G06T 11/60 | 382/232 |
| 2014/0286593 A1 * | 9/2014 | Numata | G06T 5/002 | 382/275 |
| 2014/0307110 A1 * | 10/2014 | Liu | H04N 5/23267 | 348/208.1 |
| 2015/0161773 A1 * | 6/2015 | Takahashi | H04N 5/2171 | 382/173 |

FOREIGN PATENT DOCUMENTS

| | | | | |
|---|---|---|---|---|
| CN | 102761682 A | | 10/2012 | |
| CN | 103533261 A | | 1/2014 | |
| EP | 2680567 A1 * | | 1/2014 | |
| EP | 2680567 A1 * | | 1/2014 | ............ G06T 5/002 |
| EP | 2680567 A1 * | | 1/2014 | |
| JP | 2000209507 A | | 7/2000 | |
| JP | 2008118570 A | | 5/2008 | |
| JP | 2008294601 A | | 12/2008 | |

(56) References Cited

FOREIGN PATENT DOCUMENTS

| | | | |
|---|---|---|---|
| JP | 2009105533 A | | 5/2009 |
| JP | 2010141755 A | * | 6/2010 |
| JP | 2010183127 A | | 8/2010 |
| JP | 2011254262 A | | 12/2011 |
| JP | 2012034361 A | | 2/2012 |
| JP | 2013003610 A | | 1/2013 |
| WO | WO-2010106739 A1 | * | 9/2010 ............. G06T 5/002 |

OTHER PUBLICATIONS

Communication dated May 16, 2016, issued by the Taiwan Patent Office in corresponding Taiwanese Application No. 104104148.
International Search Report dated May 12, 2015 issued in corresponding application No. PCT/JP2015/053278.
Communication dated Aug. 2, 2017 from the State Intellectual Property Office of the P.R.C. in counterpart Application No. 201580000272.4.

* cited by examiner

IMAGE PROCESSING DEVICE, IMAGE PROCESSING METHOD AND RECORDING MEDIUM FOR REDUCING NOISE IN IMAGE

CROSS REFERENCE TO RELATED APPLICATIONS

This application is a National Stage of International Application No. PCT/JP2015/053278 filed Feb. 5, 2015, claiming priority based on Japanese Patent Application No. 2014-022122 filed Feb. 7, 2014, the contents of all of which are incorporated herein by reference in their entirety.

TECHNICAL FIELD

One aspect of the present invention relates to an image processing device, an image processing method, an image processing program, and a recording medium.

BACKGROUND ART

A device for removing noise in capturing a video is known as a conventional image processing device (e.g., cf, Patent Literature 1). The image processing device described in Patent Literature 1 is configured to control a feedback coefficient of a cyclic noise reduction circuit in accordance with a difference between a video signal of current frame and a video signal of a previous frame thereof. The feedback coefficient is adapted for motion of a subject, so as to suppress an image lag of the subject in motion and reduce noise of the subject without motion.

CITATION LIST

Patent Literature

Patent Literature 1: Japanese Patent Application Laid-open Publication No. 2000-209507

SUMMARY OF INVENTION

Technical Problem

However, since the image processing device descried in Patent Literature 1 handles motion of an imaging device and the motion of the moving subject without any distinction, it causes a difference between frames over a wide range due to vibration of the camera. For making a correction to suppress the image lag of the moving subject in this state, it is necessary to weaken the effect of noise removal, which would lead to a risk of failing to achieve a satisfactory noise removal effect. In this technical field, there are demands of an image processing device, an image processing method, an image processing program, and a recording medium achieving an excellent noise removal effect.

Solution to Problem

An image processing device according to one aspect of the present invention is an image processing device for receiving and processing a frame image captured by an imaging device, to generate an output frame image, comprising: a recording unit configured to record a previous frame image input before a target frame image that is to be a processing target or an output frame image from the previous frame image; an alignment unit configured to align the target frame image with the previous frame image or with the output frame image from the previous frame image; a correction unit configured to perform a temporal correction process to correct a pixel value of the target frame image by use of a pixel value of the previous frame image or a pixel value of the output frame image from the previous frame image that has been aligned by the alignment unit, with reference to the recording unit; and a generation unit configured to generate an output frame image from the target frame image by use of the target frame image corrected by the correction unit.

In this image processing device, the target frame image is aligned with the output frame image from the previous frame image, prior to the correction of the target frame image by use of the output frame image from the previous frame image. As the target frame image is aligned with the output frame image from the previous frame image before the correction of the target frame image, the alignment cancels a motion of the imaging device between the target frame image and the previous frame image. Therefore, it can avoid weakening of the noise removal effect for suppression of the motion, and thus can achieve an excellent noise removal effect.

In one embodiment, the correction unit may further perform a spatial correction process to correct a pixel value of a pixel of the target frame image by use of pixel values of a plurality of pixels included in a region including the aforementioned pixel in the target frame image. This can achieve a better noise removal effect by a combination of the temporal correction process and the spatial correction process.

In one embodiment, the correction unit may be configured to perform the temporal correction process for a target pixel, using a coefficient according to a difference between a pixel value of the target pixel of the target frame image and a pixel value of a corresponding pixel of the previous frame image or a pixel value of a corresponding pixel of the output frame image from the previous frame image that has been aligned by the alignment unit. When configured in this manner, the device can perform the temporal correction process for a moving subject, for example, in a magnitude according to the difference.

In one embodiment, the generation unit may store the output frame image from the target frame image corrected by the correction unit, in the recording unit. Since this allows the device to perform a cyclic correction process, it can achieve the excellent noise removal effect with efficiency.

In one embodiment, the generation unit may determine a clipping region from the target frame image corrected by the correction unit, based on a motion of the imaging device, and clip the determined region, thereby generating the output frame image from the target frame image. In one embodiment, the correction unit may be configured not to handle a pixel included in at least a part of a region different from the clipping region of the target frame image, as the processing target. When configured in this manner, it is possible to improve processing efficiency.

In one embodiment, the correction unit may perform the temporal correction process for the target pixel, using a weighted average of a pixel value of the target pixel of the target frame image and pixel values of corresponding pixels of a plurality of previous frame images. Weights on the pixel values of the corresponding pixels of the previous frame images may be set to decrease toward older previous frame images, and the weights on the pixel values of the corresponding pixels of the previous frame images that are a predetermined number of frames before the target frame image, among the plurality of previous frame images, may be set so that a difference from the weight on the pixel value of the corresponding pixel of the previous frame image that is one frame after a given previous frame image or from the weight on the pixel value of the target pixel is smaller than a difference between the weight on the pixel value of the corresponding pixel of the previous frame image that is the predetermined number of frames ahead of the target frame image and the weight on the pixel value of the corresponding pixel of the previous frame image that is one frame before the previous frame image that is the predetermined number of frames ahead of the target frame image. When configured in this manner, the device can make the weights on the previous frame images of the predetermined number of frames before the target frame nearly equal to the weight on the target frame, while keeping the weights on the past input frame images at certain low levels. Thereby, a ghost (image lag) can be reduced by keeping the weights on the past input frame images at the certain low levels. Furthermore, an averaging effect can be achieved when the weights on the previous frame images of the predetermined number of frames before the target frame are set nearly equal to the weight on the target frame. As a result, it becomes possible to remove large-amplitude noise such as a flicker, without appearance of the ghost.

In one embodiment, the correction unit may calculate a weighted average while directly weighting the pixel value of the target pixel of the target frame image and the pixel values of the corresponding pixels of the previous frame images of the predetermined number of frames, and perform the temporal correction process for the target pixel, using the weighted average and the pixel value of the corresponding pixel of the output frame image from any one of the previous frame images of the predetermined number of frames. This configuration requires the device to record only the previous frame images of the predetermined number of frames and the output frame image. For this reason, when the number of previous frame images to be used in the calculation of the weighted average is properly set, the number of previous frame images to be recorded can be reduced and the amount of throughput can also be reduced. This can achieve resource saving and process efficiency improvement.

In one embodiment, the correction unit may perform the temporal correction process for the target pixel, while directly weighting the pixel value of the target pixel of the target frame image and the pixel values of the corresponding pixels of the plurality of previous frame images. This configuration can increase degrees of freedom of the temporal correction process, e.g., reduce influence of pixel values of pixels including a moving subject.

In one embodiment, the correction unit may comprise: a first correction filter configured to perform the temporal correction process for the target pixel, using the pixel value of the target pixel of the target frame image and the pixel value of the corresponding pixel of the output frame image from the previous frame image; and a second correction filter configured to perform the temporal correction process for the target pixel, using a weighted average of the pixel value of the target pixel of the target frame image and the pixel values of the corresponding pixels of the plurality of previous frame images; in the second correction filter, weights on the pixel values of the corresponding pixels of the previous frame images are set to decrease toward older previous frame images, and weights on the pixel values of the corresponding pixels of the previous frame images that are a predetermined number of frames before the target frame image, among the plurality of previous frame images, are set so that a difference from the weight on the pixel value of the corresponding pixel of the previous frame image that is one frame after a given previous frame image or from the weight on the pixel value of the target pixel is smaller than a difference between the weight on the pixel value of the corresponding pixel of the previous frame image that is the predetermined number of frames ahead of the target frame image and the weight on the pixel value of the corresponding pixel of the previous frame image that is one frame before the previous frame image that is the predetermined number of frames ahead of the target frame image. The correction unit may perform the temporal correction process for the target pixel, while switching between the first correction filter and the second correction filter, according to the target pixel. For example, when the target pixel includes large-amplitude noise such as the flicker, the second correction filter is used to remove the noise; when the target pixel does not include the large-amplitude noise such as the flicker, the first correction filter is used to remove the noise. In this way, the device can select the appropriate correction filter, depending upon the target pixel.

An image processing method according to another aspect of the present invention is an image processing method for receiving and processing a frame image captured by an imaging device, to generate an output frame image, comprising: an alignment step of aligning a previous frame image input before a target frame image that is to be a processing target or an output frame image from the previous frame image with the target frame image; a correction step of performing a temporal correction process to correct a pixel value of the target frame image by use of a pixel value of the previous frame image or a pixel value of the output frame image from the previous frame image that has been aligned by the alignment step, with reference to a recording unit recording the previous frame image or the output frame image from the previous frame image; and a generation step of generating an output frame image from the target frame image by use of the target frame image corrected by the correction step.

An image processing program according to still another aspect of the present invention is an image processing program for letting a computer function to receive and process a frame image captured by an imaging device, to generate an output frame image, the image processing program letting the computer function as: a recording unit configured to record a previous frame image input before a target frame image that is to be a processing target or an output frame image from the previous frame image; an alignment unit configured to align the target frame image with the previous frame image or with the output frame image from the previous frame image; a correction unit configured to perform a temporal correction process to correct a pixel value of the target frame image by use of a pixel value of the previous frame image or a pixel value of the output frame image from the previous frame image that has been aligned by the alignment unit, with reference to the recording unit; and a generation unit configured to generate an output frame image from the target frame image by use of the target frame image corrected by the correction unit.

A recording medium according to still another aspect of the present invention is a computer-readable recording medium storing an image processing program for letting a computer function to receive and process a frame image captured by an imaging device, to generate an output frame image, the image processing program letting the computer function as: a recording unit configured to record a previous frame image input before a target frame image that is to be a processing target or an output frame image from the previous frame image; an alignment unit configured to align the target frame image with the previous frame image or with the output frame image from the previous frame image; a correction unit configured to perform a temporal correction process to correct a pixel value of the target frame image by use of a pixel value of the previous frame image or a pixel value of the output frame image from the previous frame image that has been aligned by the alignment unit, with reference to the recording unit; and a generation unit configured to generate an output frame image from the target frame image by use of the target frame image corrected by the correction unit.

The foregoing image processing method, image processing program, and recording medium achieve the same effect as the image processing device according to one aspect of the present invention as described above.

Advantageous Effect of Invention

The various aspects and embodiments of the present invention provide the image processing device, image processing method, image processing program, and recording medium achieving the excellent noise removal effect.

DESCRIPTION OF EMBODIMENTS

Figure 1:
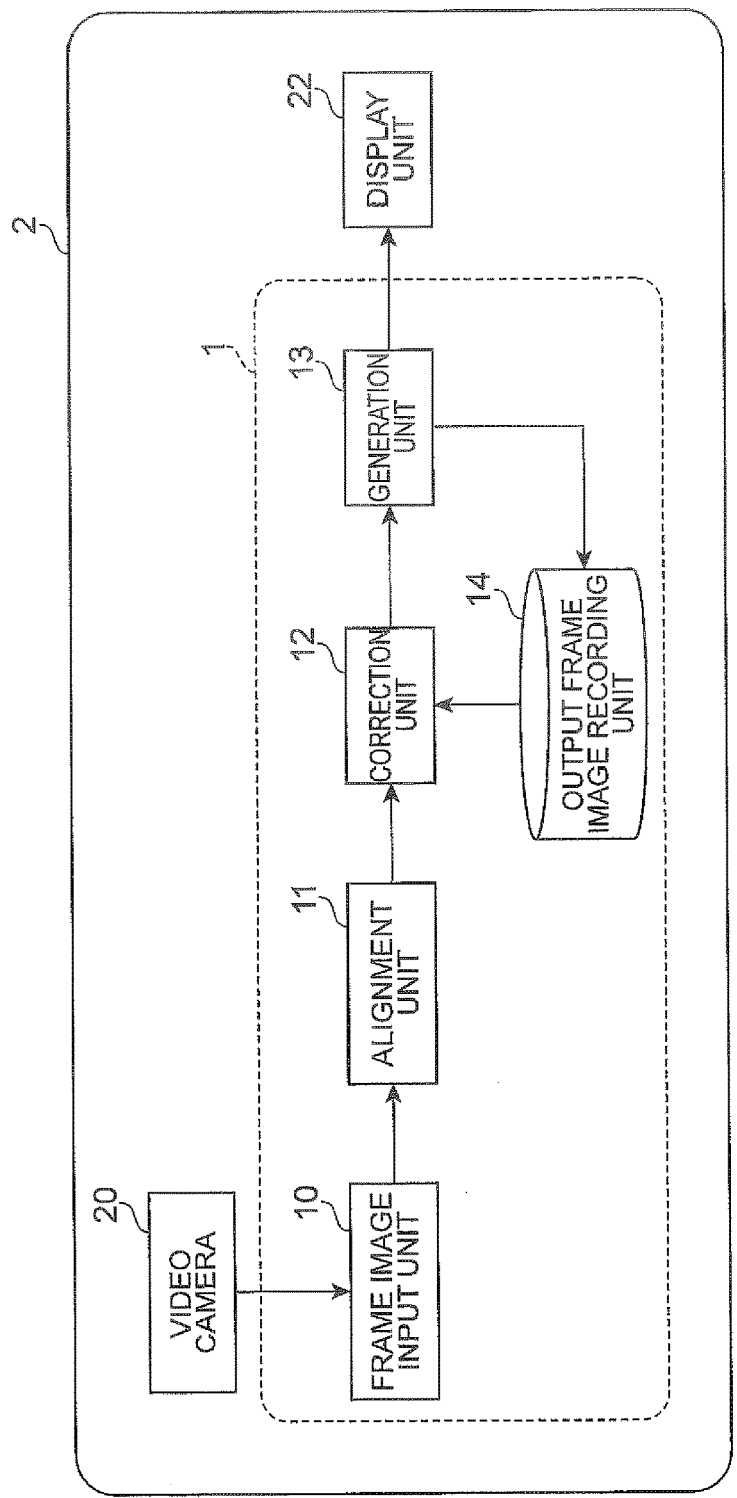
FIG. 1 is a function block diagram of a portable terminal equipped with the image processing device according to the first embodiment.

Embodiments will be described below with reference to the accompanying drawings. In the drawings identical or equivalent portions will be denoted by the same reference signs, without redundant description.

The image processing device according to an embodiment of the invention is, for example, a device for outputting a frame image from which noise is removed, and is, for example, suitably adopted for capturing a plurality of continuous images or for capturing a video. The image processing device according to the embodiment of the invention is suitably mounted on mobile terminals with limited resources, e.g., such as cell phones, digital cameras, and PDA (Personal Digital Assistant), but does not have to be limited to these ones; for example, it may be mounted on an ordinary computer system. Below, described is the image processing devices to be mounted on a portable terminal with a video capturing function, as an example, in view of easiness of understanding of the description.

First Embodiment

Figure 2:
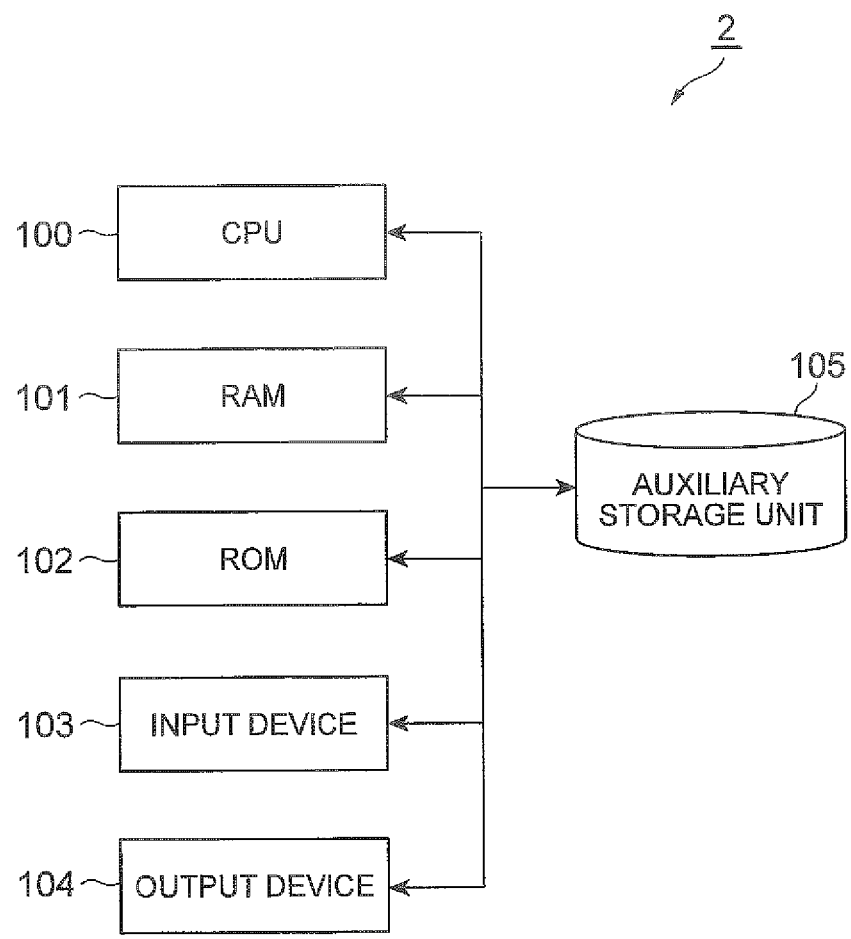
FIG. 2 is a hardware configuration diagram of the portable terminal equipped with the image processing device according to the first embodiment.

FIG. 1 is a function block diagram of portable terminal 2 provided with the image processing device 1 according to the first embodiment. The portable terminal 2 shown in FIG. 1 is, for example, a mobile terminal carried by a user and has the hardware configuration shown in FIG. 2. FIG. 2 is a hardware configuration diagram of the portable terminal 2. As shown in FIG. 2, the portable terminal 2 is physically configured as an ordinary computer system including a CPU (Central Processing Unit) 100, main storage units such as a ROM (Read Only Memory) 101 and a RAM (Random Access Memory) 102, an input device 103 such as a camera or a keyboard, an output device 104 such as a display, and an auxiliary storage unit 105 such as a hard disk. Each of functions of the portable terminal 2 and image processing device 1 described below is implemented by retrieving predetermined computer software onto the hardware such as the CPU 100, ROM 101, and RAM 102, thereby letting the input device 103 and output device 104 operated under control of the CPU 100 and performing reading and writing of data from and in the main storage units and/or the auxiliary storage unit 105. The above description was given as description of the hardware configuration of the portable terminal 2, but it is noted that the image processing device 1 may be configured as an ordinary computer system including the CPU 100, the main storage units such the ROM 101 and RAM 102, the input device 103, the output device 104, and the auxiliary storage unit 105. The portable terminal 2 may be provided with a communication module and the like.

As shown in FIG. 1, the portable terminal 2 is provided with a video camera (imaging device) 20, the image processing device 1, and a display unit 22. The video camera 20 has a function to capture a video. The video includes continuous frame images in time series. The video camera 20 may have a continuous image capturing function to repetitively capture images at predetermined intervals from a time designated by a user operation or the like. The video camera 20 outputs a frame image to the image processing device 1.

The image processing device 1 receives and processes a frame image captured by the video camera 20, to generate an output frame image. For example, the image processing device 1 has a function to remove noise from the input frame image and output the resultant image as the output frame image. The noise herein is, for example, a flicker that occurs on a captured image. The noise may be, for example, pixel values varying at random with a lapse of time between frame images (temporal noise), or, a pixel value extremely different from pixel values of surrounding pixels within the same frame (spatial noise). A pixel value refers to information associated with a pixel including, for example, a luminance value, a color-difference value, chroma, and so on.

The image processing device 1 is provided, for example, with a frame image input unit 10, an alignment unit 11, a correction unit 12, a generation unit 13, and an output image recording unit 14.

The frame image input unit 10 has a function to receive a frame image captured by the video camera 20. The frame image input unit 10 outputs the input frame image to the alignment unit 11.

The alignment unit 11 has a function to implement alignment between frame images. The alignment unit 11 performs, for example, an association operation to associate coordinates between frame images. The alignment unit 11 may be configured to calculate a difference between frame images and implement the association of coordinates between frame images based thereon or may be configured to calculate a positional change of an origin between frame images and implement the association of coordinates between frame images based thereon. As another example, the image processing device 1 may be equipped with a gyro sensor, and the alignment unit 11 is configured to acquire a motion between a target frame image and a previous frame image, using the result of detection by the gyro sensor. In the case using the result of detection by the gyro sensor, compared to the case using data of images only, noise can be removed with excellent robustness.

In the case using the difference between images, for example, the alignment unit 11 performs alignment, using a target frame image that is to be a processing target and a noise-removed previous frame image which has been input in the image processing device 1 before the target frame image. The target frame image is, for example, a frame image currently input, and the previous frame image is, for example, a frame image that is one frame before the target frame image. The output frame image recording unit 14 stores the previous frame image from which noise has been removed by the previous process. The alignment unit 11 acquires the noise-removed previous frame image, for example, with reference to the output frame image recording unit 14. As another example, the alignment unit 11 may perform the alignment between the target frame image that is to be a processing target and a previous frame image from which noise is not removed yet. In this case, the frame image input unit 10 stores the previous frame image in a recording unit provided in the image processing device 1 and then the alignment unit 11 can acquire the previous frame image with reference to the recording unit. As another example, the image processing device 1 may be equipped with a gyro sensor, and configured to acquire a motion between the target frame image and the previous frame image, using the result of detection by the gyro sensor.

The alignment unit 11 outputs, for example, data regarding the alignment to the correction unit 12. The data regarding the alignment is, for example, data to associate positions of origins of two frame images. The correction unit 12 performs a correction process using the frame images aligned with each other.

The correction unit 12 performs the correction to remove noise from the target frame image. As described above, a pixel including noise can take a pixel value varying at random according to a lapse of time between frame images or a pixel value (a pixel value including chromatic noise) extremely different from the ones at pixel positions of surrounding pixels within the same frame. For this reason, the correction unit 12 removes noise by a combination of two correction processes.

The first correction process performed by the correction unit 12 is a process to perform a correction using only information of the target frame image. Namely, the first correction process can also be performed prior to the alignment process. Since the first correction process is carried out using only the information of the target frame image, it can be executed with acquisition of two-dimensional coordinate positions. The first correction process will be referred to hereinafter as spatial correction process. The spatial correction process is a correction to remove noise (spatial noise) included in the target frame image. The noise includes noise of color and luminance components. The correction unit 12 uses a smoothing filter or the like to calculate an average of pixel values of pixels located around a target pixel and correct pixel values including chromatic noise by use of the average thus calculated. The advantage of the spatial correction process is that the noise can be robustly removed even if a moving subject exists in an image frame. However, since it uses information at spatially different positions, the average could be largely different from real pixel values. For this reason, the smoothing process may be applied to a region where variation in pixel value is below a certain level, e.g., a region where variation in pixel value is not more than a predetermined value. The correction unit 12 may be configured to set a removal level according to chromatic noise and increase the number of correction times with increase in the set level. The correction unit 12 may be configured to thin the target pixels to one fourth and interpolate intermediate values, for example, by bilinear interpolation or the like after the correction process. It may also be configured to additionally perform a correction to enhance color in combination with the spatial correction process. In this case, it is possible to improve the quality of the image faded in color by the spatial correction process.

The second correction process performed by the correction unit 12 is a process to perform a correction using information of the previous frame image after the alignment. Namely, the second correction process is executed after the alignment process. The second correction process will be referred to hereinafter as temporal correction process. For example, the correction unit 12 generates a target frame image after removal of noise, using pixel values of pixels of the target frame image and pixel values of corresponding pixels of the output frame image generated from the previous frame image after the alignment. Alternatively, for example, the correction unit 12 generates pixel values of an output frame image from the target frame image, using pixel values of pixels of the target frame image and pixel values of corresponding pixels of the previous frame image after the alignment.

The correction unit 12 may be configured to refer to, not only the previous frame image that is one frame before the target frame image but also a previous frame image or images older than the given previous frame image, to acquire pixel values of corresponding pixels of the previous frame images and average the acquired pixel values. For example, the correction unit 12 may perform the temporal correction process for a target pixel, directly using a pixel value of the target pixel of the target frame image and pixel values of corresponding pixels of a plurality of previous frame images aligned by the alignment unit 11. In this case, the correction filer to be applied is the so-called noncyclic filter. Alternatively, the correction unit 12 may be configured to record a noise-removed previous frame image and correct the target frame image, using the recorded previous frame image. Namely, the correction unit 12 may perform the temporal correction process for a target pixel, using a pixel value of the target pixel of the target frame image and a pixel value of a corresponding pixel of the output frame image from the previous frame image. In this case, the correction filter to be applied is the so-called cyclic filter and it is sufficient for the device to record only the noise-removed previous frame image; therefore, it can achieve resource saving and processing efficiency improvement. The advantage of the temporal correction process is that, in the case of capturing a landscape or the like, it is possible to employ many pixel values of the previous frame image and therefore noise (temporal noise) can be effectively removed with texture unchanged. However, since the information used herein is that at temporally different positions, when the frame image includes a picture of a moving subject, the result might be an unnatural image if the average is used as it is. For this reason, the temporal correction process for a target pixel may be performed using a coefficient according to a difference between a pixel value of the target pixel of the target frame image and a pixel value of a corresponding pixel of the output frame image from the previous frame image aligned by the alignment unit. For example, when the difference is not less than a predetermined value, the coefficient may be set so as to weaken the temporal correction process for the target pixel; or, when the difference is not less than the predetermined value, the coefficient may be set so as not to perform the temporal correction process.

The correction unit 12 performs the noise removal by either one or a combination of the above-described spatial correction process and temporal correction process. When the correction unit 12 performs the correction by the combination of the spatial correction process and temporal correction process, it can perform the more suitable correction while utilizing the each other's advantages of the two processes. The correction unit 12 outputs the corrected target frame image to the generation unit 13.

The generation unit 13 clips a part of the corrected target frame image to generate the output frame image. The generation unit 13 is configured, for example, to transmit and store the output frame image to the output frame image recording unit 14 and to make the display unit 22 display it. The display unit 22 is a device that can display an image or picture, e.g., a display device.

Figure 3:
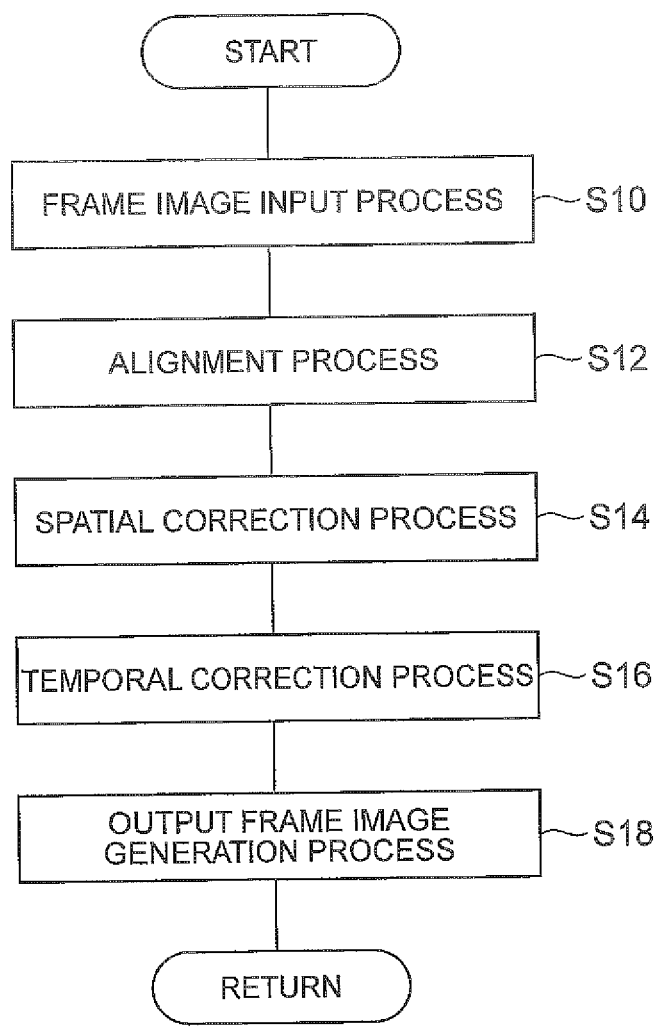
FIG. 3 is a flowchart to illustrate the operation of the image processing device according to the first embodiment.

The following will describe the operation of the image processing device 1 according to the first embodiment. FIG. 3 is a flowchart showing the operation of the image processing device 1 according to the first embodiment. The control processing shown in FIG. 3 is executed, for example, at the timing when the image capturing function of the portable terminal 2 is turned on, and is repetitively executed at a predetermined frequency. In view of easiness of understanding of description, the input frame image that is to be a processing target is assumed to be the second or subsequent input frame image.

As shown in FIG. 3, the image processing device 1 first executes a frame image input process (S10). In the process of S10, the frame image input unit 10 receives a target frame image $frame^i{}_{\_In}$ from the video camera 20. After completion of the process of S10, the flow moves to an alignment process (S12: alignment step).

Figure 4:
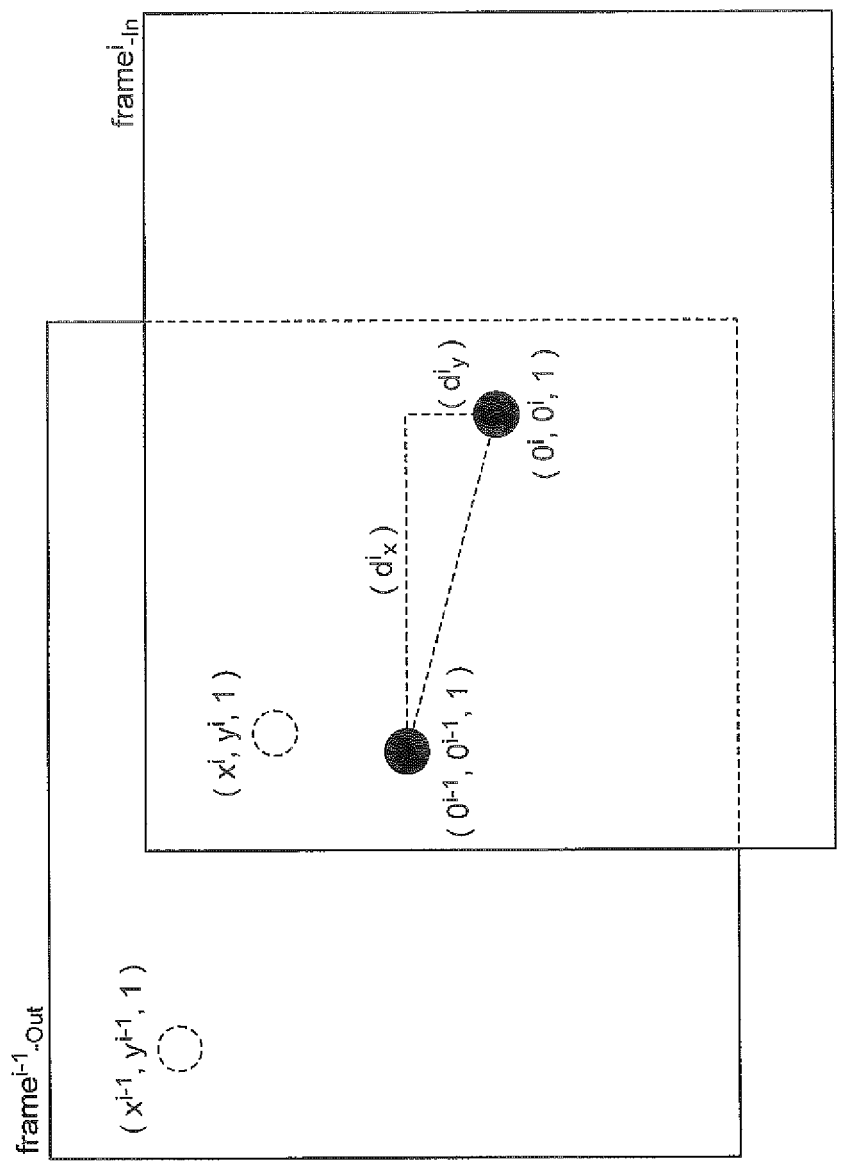
FIG. 4 is a schematic diagram to illustrate an alignment process.

In the process of S12, the alignment unit 11 performs alignment between the target frame image $frame^i{}_{\_In}$ and an output frame image $frame^{i-1}{}_{\_Out}$ for a previous frame image $frame^{i-1}{}_{\_In}$. Various methods are available for the alignment as described above, and the below will describe an example in which the alignment is performed by image information only. FIG. 4 is a drawing to illustrate the alignment performed by use of two frame images. As shown in FIG. 4, the alignment may be performed by associating the origin position $(0^{i-1}, 0^{i-1}, 1)$ of the output frame image $frame^{i-1}{}_{\_Out}$ with the origin position $(0^i, 0^i, 1)$ of the target frame image $frame^i{}_{\_In}$ or by associating predetermined feature points $(x^{i-1}, y^{i-1}, 1)$ and $(x^i, y^i, 1)$ with each other. After completion of the process of S12, the flow moves to a spatial correction process (S14: correction step).

Figure 5:
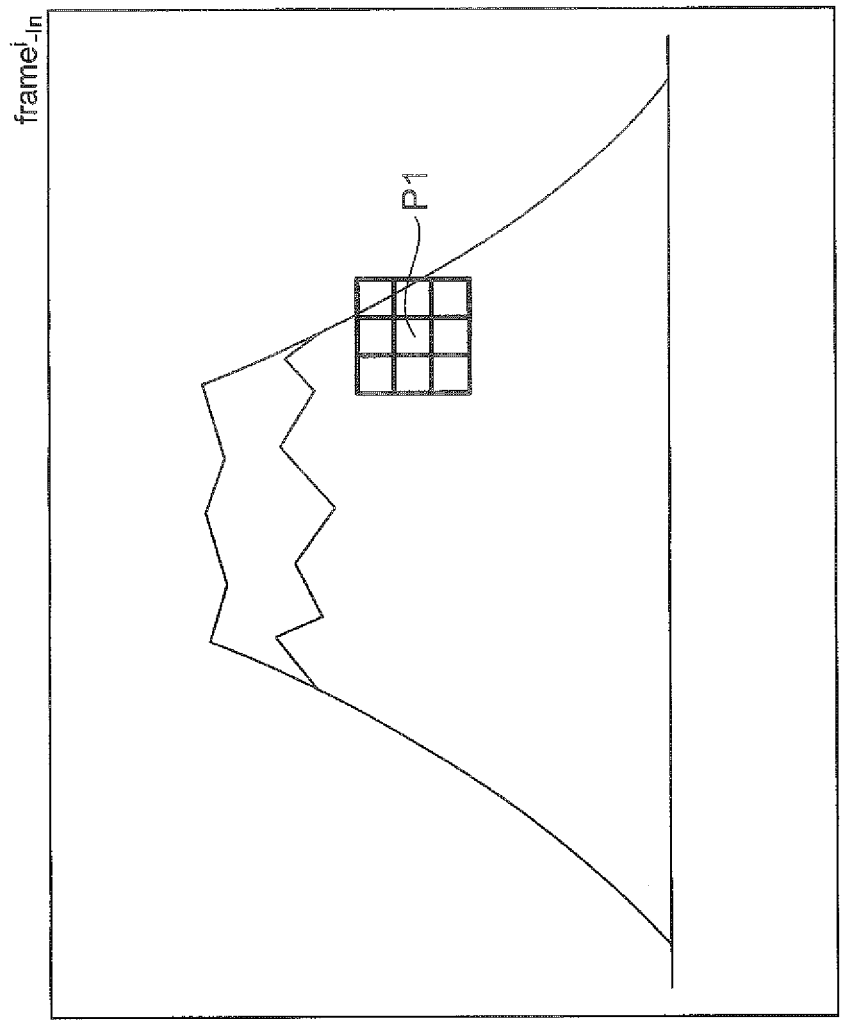
FIG. 5 is a schematic diagram to illustrate a spatial correction process.

In the process of S14, the correction unit 12 removes noise by use of only the image information of the target frame image $frame^i{}_{\_In}$. The correction unit 12 applies, for example, the smoothing filter to the whole of the target frame image $frame^i{}_{\_In}$. The smoothing filter averages pixel values of pixels included in a surrounding region around a target pixel. The surrounding region is a predetermined range including the target pixel. The predetermined range to be used herein is, for example, 8 neighboring pixels, 24 neighboring pixels, or 48 neighboring pixels around the pixel of interest. FIG. 5 is a schematic view to illustrate the spatial correction process. As shown in FIG. 5, the target pixel P1 exists in the target frame image $frame^i{}_{\_In}$. The correction unit 12 corrects a pixel value of the target pixel P1, using pixel values of eight neighboring pixels around the target pixel P1, as an example. For example, the correction unit 12 corrects the pixel value of the target pixel P1 so that it becomes closer to an average of the pixel values of the eight neighboring pixels. After completion of the process of S14, the flow moves to a temporal correction process (S16: correction step).

Figure 6:
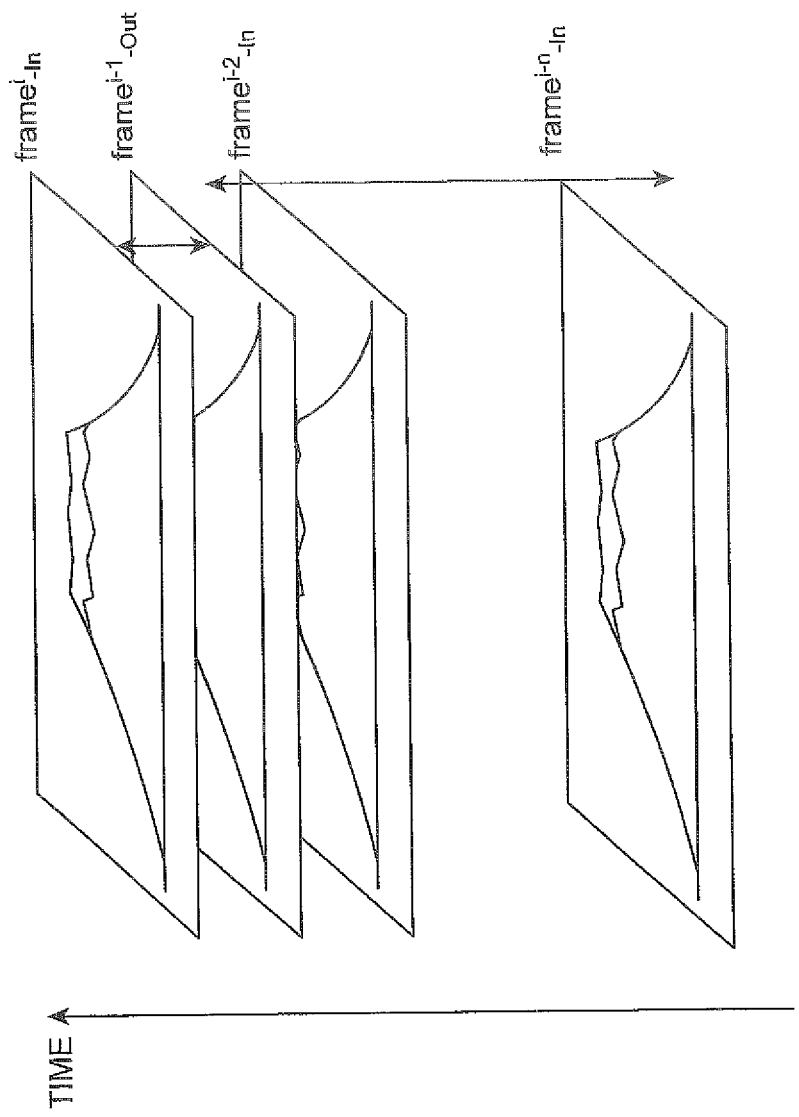
FIG. 6 is a schematic diagram to illustrate a temporal correction process.

In the process of S16, the correction unit 12 removes noise, using the image information of the target frame image $frame^i{}_{\_In}$ and the image information of the output frame image $frame^{i-1}{}_{\_Out}$ for the previous frame image $frame^{i-1}{}_{\_In}$. FIG. 6 is a schematic view to illustrate the temporal correction process. As shown in FIG. 6, let us assume that the output frame image $frame^{i-1}{}_{\_Out}$ for the previous frame image $frame^{i-1}{}_{\_In}$ has been corrected with reference to past images from the previous frame image $frame^{i-2}{}_{\_In}$ to the previous frame image $frame^{i-n}{}_{\_In}$. In this case, when the target frame image $frame^i{}_{\_In}$ is corrected using the information of the output frame image $frame^{i-1}{}_{\_Out}$ for the previous frame image $frame^{i-1}{}_{\_In}$, the correction achieves the same effect as in the case where the correction is made with reference to the images from the previous frame image $frame^{i-1}{}_{\_In}$ to the previous frame image $frame^{i-n}{}_{\_In}$. Therefore, the device needs to retain only the image information of the output frame image $frame^{i-1}{}_{\_Out}$ for the previous frame image $frame^{i-1}{}_{\_In}$ and thus the device does not have to retain the other past previous frame images. Hence, it can provide an excellent noise reduction effect, while achieving the resource saving and processing efficiency improvement.

Figure 7:
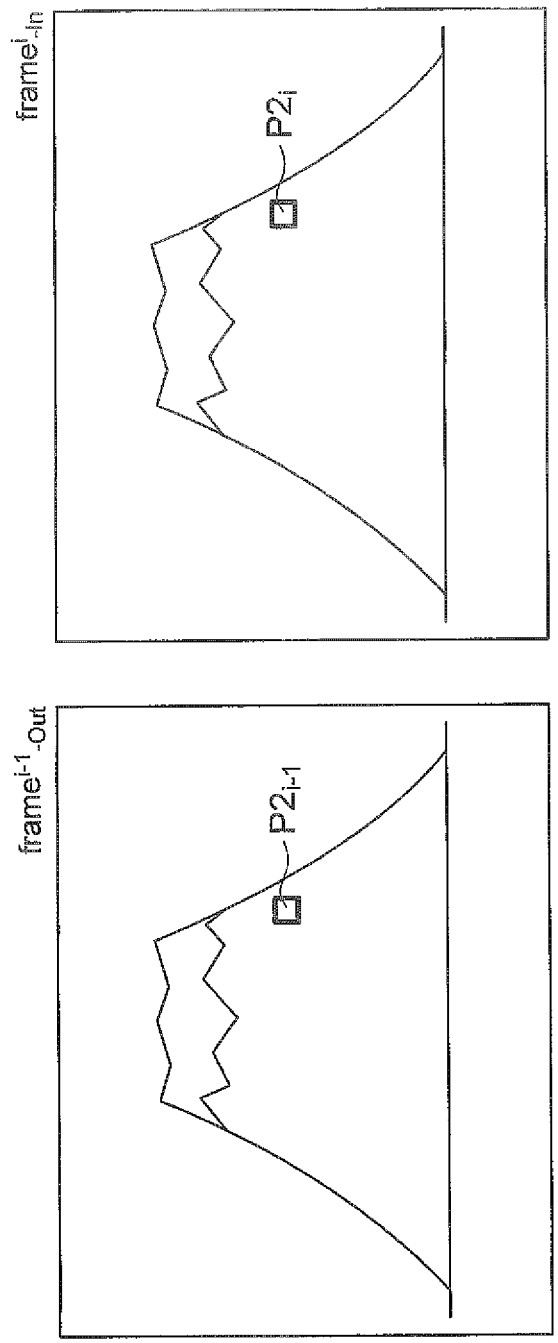
FIG. 7 is a schematic diagram to illustrate the temporal correction process.

The correction unit 12 performs averaging, for example, with reference to a target pixel of the target frame image $frame^i{}_{\_In}$ and a pixel of the output frame image $frame^{i-1}{}_{\_Out}$ for the previous frame image $frame^{i-1}{}_{\_In}$. FIG. 7 is a schematic view to illustrate the temporal correction process. In FIG. 7, the target pixel $P2_i$ exists in the target frame image $frame^i{}_{\_In}$ and the target pixel $P2_{i-1}$ exists in the output frame image $frame^{i-1}{}_{\_Out}$. As shown in FIG. 7, the correction unit 12 generates a noise-removed target frame image $frame^i{}_{\_In}$, using a pixel value of the target pixel $P2_i$ of the target frame image $frame^i{}_{\_In}$ and a pixel value of the pixel $P2_{i-1}$ located at a position corresponding to the target pixel $P2_1$.

Figure 8:
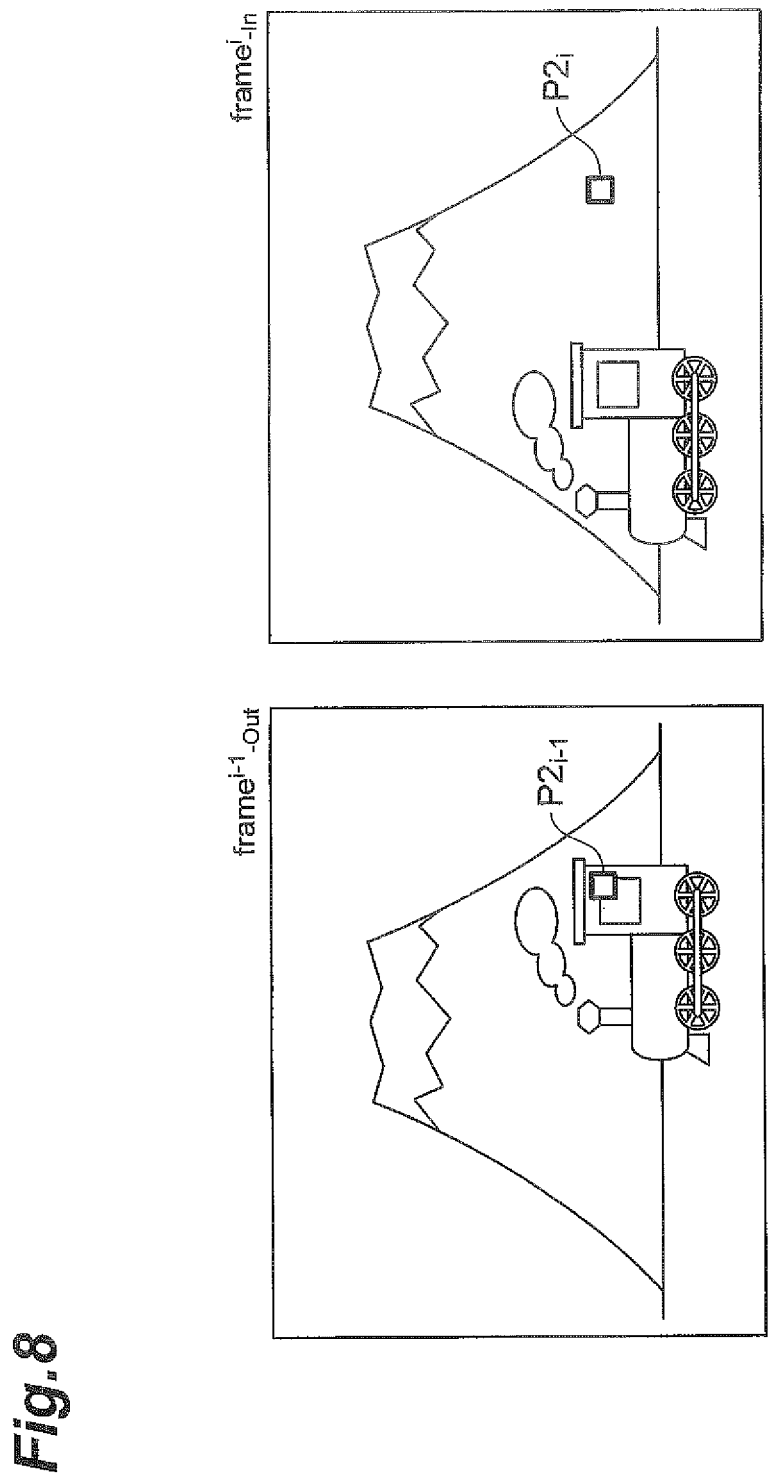
FIG. 8 is a schematic diagram to illustrate the temporal correction process.

Furthermore, the correction unit 12 may modify the process if there is a moving subject. FIG. 8 is a schematic view to illustrate the temporal correction process in the presence of the moving subject. In FIG. 8, the target pixel $P2_i$ exists in the target frame image $frame^i{}_{\_In}$ and the target pixel $P2_{i-1}$ exists in the output frame image $frame^{i-1}{}_{\_Out}$. As shown in FIG. 8, the target pixel $P2_i$ and the moving subject do not overlap each other in the target frame image frame$^i_{\_In}$ but the target pixel P2$_{i-1}$ and the moving subject overlap each other in the output frame image frame$^{i-1}_{\_Out}$. When there is the moving subject as in this case, the difference is large between the pixel value of the target pixel P2$_i$ and the pixel value of the target pixel P2$_{i-1}$. Therefore, the device may be configured so as not to perform the temporal correction process, for example, if the difference between the pixel value of the target pixel P2$_i$ and the pixel value of the target pixel P2$_{i-1}$ is not less than a predetermined value.

The correction unit 12 may perform the averaging operation with weights on the pixel value of the target pixel P2$_i$ and on the pixel value of the pixel P2$_{i-1}$. In general, when a weight on a pixel value of a previous frame is larger than a weight on a pixel value of a target frame image, the noise removal effect becomes greater. The device may be configured so as not to perform the temporal correction process if the difference between pixel values at corresponding positions is large, i.e., if there is the difference not less than a predetermined value. After completion of the process of S16, the flow moves to an output frame image generation process (S18: generation step).

Figure 9A:
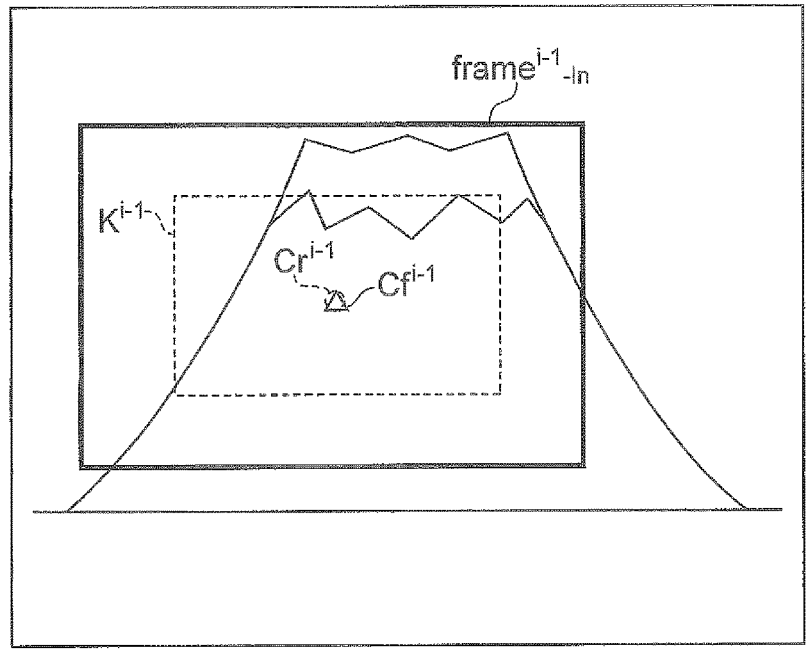
FIGS. 9A and 9B are schematic diagrams to illustrate output image frames and hand-shake correction.
Figure 9B:
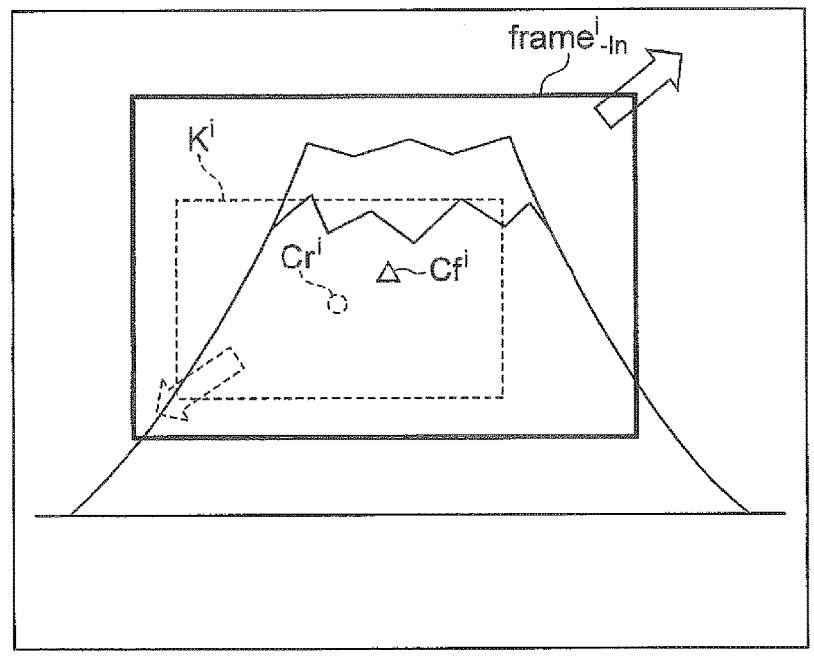

In the process of S18, the generation unit 13 generates an output frame image frame$^i_{\_Out}$ from the noise-removed target frame image frame$^i_{\_In}$ obtained in the process of S16. The generation unit 13 may define the noise-removed target frame image frame$^i_{\_In}$ obtained by the process of S16 as the output frame image frame$^i_{\_Out}$, without execution of any specific process, or may define a clipped region as the output frame image frame$^i_{\_Out}$. For example, for making a handshake correction, the generation unit 13 may be configured to determine a clipping region from the noise-removed target frame image frame$^i_{\_In}$ on the basis of a motion of the video camera 20 and to clip the determined region to generate the output frame image frame$^i_{\_Out}$ for the target frame image frame$^i_{\_In}$. FIGS. 9A and 9B are explanatory drawings to illustrate the generation of the output frame image frame$^i_{\_Out}$ by clipping of a region. As shown in FIG. 9A and FIG. 9B, let us define continuous frame images captured by the video camera 20, as frame$^{i-1}$ and frame$^i$ and their center positions as Cf$^{i-1}$ and Cf$^i$. The image processing device 1 sets a clipping region K$^{i-1}$ in a size smaller than the frame image frame$^{i-1}$. For example, the size of the clipping region K$^{i-1}$ is from 70 to 90% of the size of the frame image frame$^{i-1}$. This clipping region K$^{i-1}$ is defined as an output frame image. Next, let us assume that the video camera 20 moved from the capturing position indicated in FIG. 9A to the capturing position indicated in FIG. 9B (a shift in a right upward direction indicated by a solid arrow in FIG. 9B). In this case, the frame image frame$^i$ is obtained as an image resulting from the right upward shift of the frame image frame$^{i-1}$. On this occasion, the image processing device 1 sets a clipping region K$^i$ at a position to cancel the motion between the frame image frame$^{i-1}$ and the frame image frame$^i$ (with a shift in a left downward direction indicated by a dotted arrow in FIG. 9B). This makes the center position Cr$^{i-1}$ of the clipping region K$^{i-1}$ approximately identical with the position Cr$^i$ and thus the output frame image is generated as if it is stationary, and is output to the display unit 22. The clipping of the region may be simple clipping or may also be clipping by combination with affine transformation, perspective transformation or the like.

The above completes the control processing shown in FIG. 3. Since the alignment can be performed before the correction through the execution of the control processing shown in FIG. 3, it becomes possible to avoid occurrence of the difference between frames in a wide range due to vibration of the video camera 20. Therefore, the device can achieve an excellent noise removal effect.

The following will describe an image processing program for letting the portable terminal (computer) 2 function as the foregoing image processing device 1.

The image processing program has a main module, an input module, and an arithmetic processing module. The main module is a part that generally controls image processing. The input module makes the portable terminal 2 operate to acquire a frame image. The arithmetic processing module has an alignment module, a correction module, and a generation module. Functions realized through execution of the main module, the input module, and the arithmetic module are the same as the functions of the frame image input unit 10, the alignment unit 11, the correction unit 12, and the generation unit 13, respectively, of the foregoing image processing device 1.

The image processing program is provided, for example, in the form of a recording medium such as ROM, or a semiconductor memory. The image processing program may be provided as a data signal through a network.

In the image processing device 1, image processing method, and image processing program according to the first embodiment, as described above, the target frame image can be aligned with the output frame image from the previous frame image before the correction of the target frame image, which can cancel the motion of the imaging device between the target frame image and the previous frame image. Therefore, it is possible to avoid the need for weakening of the noise removal effect for suppression of motion, which can achieve the excellent noise removal effect.

Second Embodiment

Incidentally, a captured video can suffer occurrence of a flicker. The flicker is a blink of the video occurring due to difference of frequencies when the frequency of the blink of the subject is different from the sampling frequency of the video camera (imaging device). Since this flicker has large amplitude, forcible removal thereof would lead to appearance of a ghost (image lag). The below will describe the image processing device for removing noise including the large-amplitude noise such as this flicker. The flicker will be described as an example of the large-amplitude noise.

The image processing device 1 according to the second embodiment is configured approximately in the same configuration as the image processing device 1 according to the first embodiment, and is different in function of the correction unit 12 in part. Specifically, it is different in that the correction unit 12 performs a correction for removal of the larger-amplitude noise from the target frame image. The following will mainly describe the difference from the image processing device 1 of the first embodiment, while omitting the description of redundant portions.

The correction unit 12 performs the correction to remove the noise from the target frame image. Since the flicker is a blink of the video, it can be regarded as temporal noise. For this reason, the correction unit 12 removes the noise by a combination of two correction processes, the spatial correction process and the temporal correction process, in the same manner as in the first embodiment. Since the spatial correction process is the same as in the first embodiment, the description thereof is omitted herein. In the present embodiment, the target frame image and previous frame image after the alignment and before execution of the temporal correction process will be called input frame images.

The temporal correction process is a correction process for removal of the temporal noise including the flicker. The correction unit 12 performs the temporal correction process for a target pixel, using a weighted average of a pixel value of the target pixel of the target frame image and pixel values of corresponding pixels of a plurality of previous frame images. Specifically, the correction unit 12 directly or indirectly weights pixel values of pixels of a plurality of input frame images and calculates an average of the weighted pixel values to obtain a weighted average. If the weights are set so that a total of the weights on the pixel values of the pixels of the plurality of input frame images becomes 1, the correction unit 12 adds up the weighted pixel values to calculate the weighted average.

Figure 10:
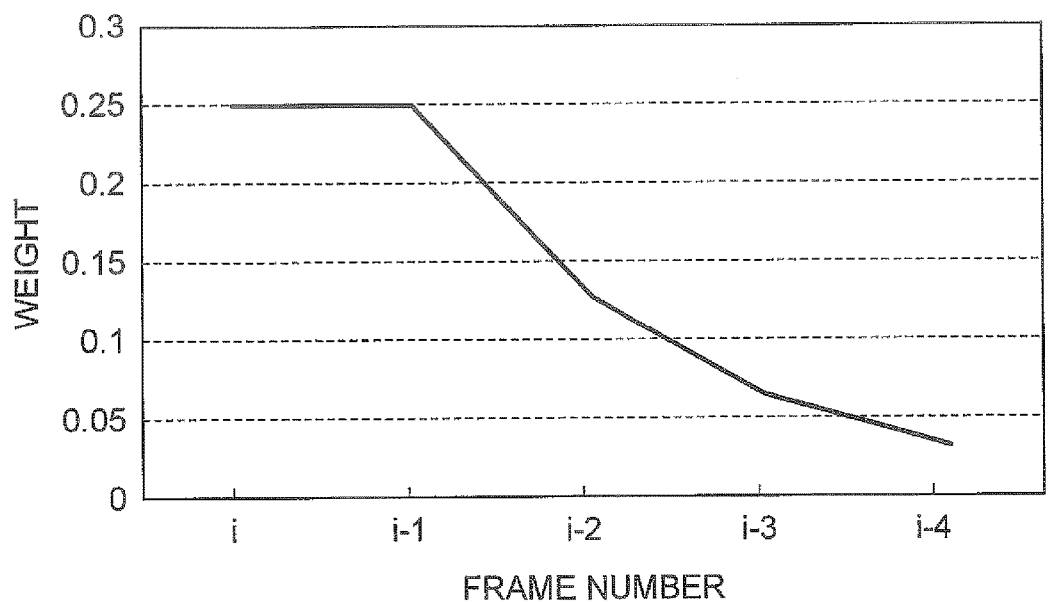
FIG. 10 is a drawing showing an example of weights on input frame images.

FIG. 10 is a drawing showing an example of the weights on the input frame images. In FIG. 10, a frame number of the target frame image is denoted by i, and frame numbers of the input frame images are denoted by i−1, i−2, . . . in a temporally backward order with respect to the target frame image. As shown in FIG. 10, among the plurality of input frame images, a large weight is set on pixel values of pixels of the target frame image and on pixel values of pixels of the previous frame image temporally close to the target frame image, and weights not to increase the ghost are set on pixel values of pixels of the previous frame images temporally far from the target frame image. Namely, the weights on pixel values of corresponding pixels of the input frame images are set so as to decrease toward older input frame images, and the weights on pixel values of corresponding pixels of previous frame images that are a predetermined number of frames before the target frame image, among the plurality of input frame images, are set so that a difference from a weight on a pixel value of the corresponding pixel of the previous frame image that is one frame after the given previous frame image or from a weight on a pixel value of a target pixel is smaller than a difference between a weight on a pixel value of the corresponding pixel of the previous frame image that is the predetermined number of frames ahead of the target frame image and a weight on a pixel value of the corresponding pixel of a previous frame image that is one frame before the given previous frame image. In other words, for the input frame images from the target frame image to the previous frame image that is the predetermined number of frames ahead of the target frame image, the weights are set so that the difference (the absolute value of the difference) between the weights on the corresponding pixels (the target pixel in the case of the target frame image) of two temporally adjacent input frame images is smaller than the difference between the weight on the pixel value of the corresponding pixel of the previous frame image that is the predetermined number of frames ahead of the target frame image and the weight on the pixel value of the corresponding pixel of a previous frame image that is one frame before the previous frame image that is the predetermined number of frames ahead of the target frame image. The predetermined number of frames is, for example, approximately from 1 to 2.

The correction filter to perform the weighted averaging of pixel values can be configured as one of a noncyclic filter for directly weighting the pixel values of the pixels of the plurality of input frame images and directly averaging the weighted pixel values, a cyclic filter using the pixel values of the pixels of the output frame image after the correction of the previous frame image, and so on. The below will describe the temporal correction process using the cyclic filter, in view of built-in type mounting.

The correction unit 12 performs the temporal correction process for a target pixel by the cyclic filter which calculates the weighted average while directly weighting the pixel value of the target pixel of the target frame image and the pixel values of the corresponding pixels of the previous frame images of the predetermined number of frames temporally close to the target frame image and which uses the weighted average and the pixel value of the corresponding pixel of the output frame image from any one of the previous frame images of the predetermined number of frames. A preferred output frame image to be used in this cyclic filter is the output frame image from the previous frame image that is one frame before the target frame image. The correction unit 12 performs the temporal correction process, for example, by the cyclic filter using the weighted average of the pixel value of the target pixel of the target frame image and the pixel value of the corresponding pixel of the previous frame image that is one frame before the target frame image, and the output frame image from the previous frame image that is one frame before the target frame image.

The temporal correction process using this cyclic filter is expressed by Formula (1), using the pixel value $I^j_{In}$ of the pixel $P^j_{In}$ of the j-th input frame image frame$^j\_{In}$, the pixel value $I^i_{Out}$ of the pixel $P^i_{Out}$ after the correction of the pixel $P^{i-1}_{In}$, the pixel value $I^{i-1}_{Out}$ of the pixel $P^{i-1}_{Out}$ after the correction of the pixel $P^{i-1}_{In}$, the weight $w_j$ on each pixel value $I^j_{In}$, and a coefficient α of the cyclic filter. In this formula, the target frame image is assumed to be the i-th input frame image.

[Math 1]

$$I^i_{Out} = \sum_{j=i-n+1}^{i} I^j_{In} \times w_j \times (1-\alpha) + I^{i-1}_{Out} \times \alpha \qquad (1)$$

The first term of the right side in Formula (1) is to calculate the weighted average $I_{wave}$ of the pixel value of the target frame image and the pixel values of the pixels of the previous frame images temporally close to the target frame image, using the n input frame images including the target frame image. Since this calculation is not affected by the previous frame images temporally far from the target frame image, the weight $w_j$ is set large. The second term of the right side in Formula (1) uses the pixels after the correction of the pixels of the previous frame image that is one frame before the target frame image, incorporating the feature of the cyclic filter. This allows the pixel values of the pixels of the previous frame images temporally far from the target frame image, to be used in the averaging for the pixel value of the target pixel. The number n of input frame images used in the first term of the right side in Formula (1) is determined in view of a balance between performance of the image processing device 1 and processing load thereon. With increase in the number n, the capacity of buffer increases and the processing time becomes longer; therefore, the number n is, for example, approximately from 2 to 3.

The weight $w_j$ may be a predetermined constant. Since the temporal correction process uses information at temporally different positions, when the frame images include a picture of a moving subject, an unnatural image might result from the calculation with the weight $w_j$ as a constant. For this reason, the correction unit 12 may be configured to dynamically calculate the weight $w_j$, depending upon the difference between the pixel value $I^i_{In}$ of the target pixel $P^i_{In}$ of the target frame image frame$^i\_{In}$ and the pixel value $I^j_{In}$ of the corresponding pixel $P^j_{In}$ of the previous frame image frame$^j\_{In}$ temporally close to the target frame image frame$^j\_{In}$. For example, the correction unit 12 may set the weight $w_j$ in such a manner that if the foregoing difference (the absolute value of the difference) is not less than a predetermined value, the weight $w_j$ is set small to reduce influence of the pixel value $I^j\_{In}$ of the corresponding pixel $P^j\_{In}$ on the temporal correction process, or, in such a manner that if the difference is not less than the predetermined value, the pixel value $I^j\_{In}$ of the corresponding pixel $P^j\_{In}$ is not used for the temporal correction process. On the occasion of the calculation of the difference, the previous frame image frame$^j\_{In}$ temporally close to the target frame image frame$^i\_{In}$ is aligned with the target frame image frame$^i\_{In}$.

The coefficient α is a value from 0 to 1. The coefficient α may be a predetermined constant. Just as in the case of the weight $w_j$, when the frame images include a picture of a moving subject, an unnatural image might result from the calculation with the coefficient α as a constant. For this reason, the correction unit 12 may dynamically calculate the coefficient α, depending upon the difference between the pixel value $I^{i-1}\_{Out}$ of the corresponding pixel $P^{i-1}\_{Out}$ of the output frame image frame$^{i-1}\_{Out}$ for the previous frame image frame$^{i-1}\_{In}$ one frame before the target frame image, and the weighted average $I_{wave}$. For example, the correction unit 12 may set the coefficient α in such a manner that if the foregoing difference (the absolute value of the difference) is not less than the predetermined value, the coefficient α is set small to reduce influence of the pixel value $I^{i-1}\_{IOut}$ of the corresponding pixel $P^{i-1}\_{Out}$ on the temporal correction process, or, in such a manner that if the difference is not less than the predetermined value, the pixel value $I^{i-1}\_{Out}$ of the corresponding pixel $P^{i-1}\_{Out}$ is not used for the temporal correction process. On the occasion of the calculation of the difference, the output frame image frame$^{i-1}\_{Out}$ is aligned with the target frame image frame$^i\_{In}$.

If there is a moving subject, the coefficient may be set so as to enhance the spatial correction process. The temporal correction process may be carried out in block units. A block to be used herein can be a predetermined number of pixels such as 8 pixels, 24 pixels, or 48 pixels in the vicinity of a target pixel.

Figure 11:
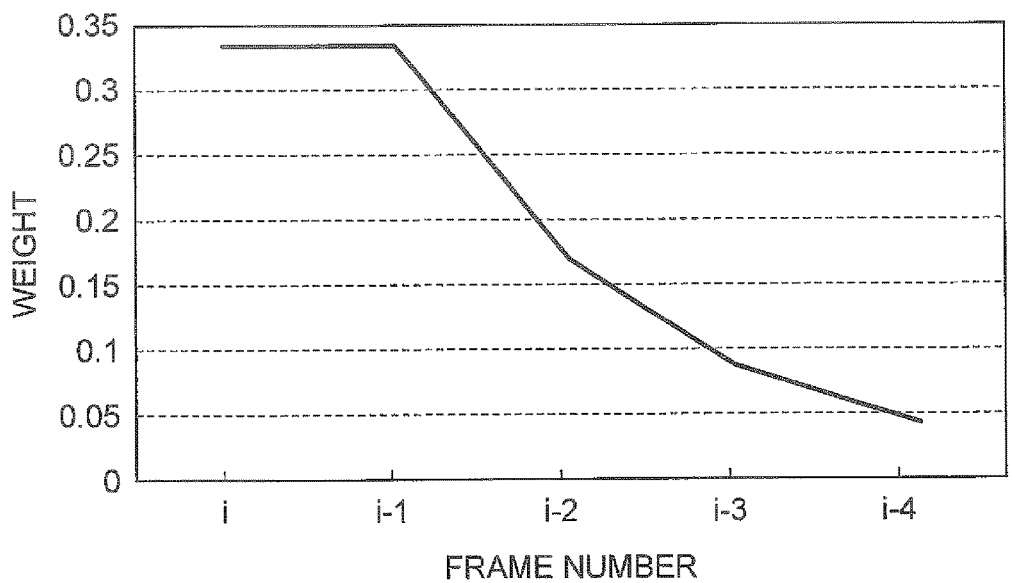
FIG. 11 is a drawing showing another example of weights on input frame images.

FIG. 11 is a drawing showing another example of the weights on the input frame images. The distribution of weights shown in FIG. 11 is obtained by setting the number n to 2, the coefficient α to ½, the weight $w_i$ to ⅔, and the weight $w_{i-1}$ to ⅓. In this case, the weights on the pixel values of the pixels of the target frame image and the previous frame image that is one frame before the target frame image are set to ⅓, and the weights on the pixel values of the pixels of the previous frame images two or more frames before the target frame image are set so as to decrease in a temporally backward direction.

The correction unit 12 performs the noise removal by the aforementioned temporal correction process or by the combination of the aforementioned spatial correction process and temporal correction process. When the correction unit 12 performs the correction by the combination of the spatial correction process and the temporal correction process, it can implement the more suitable correction by utilizing the each other's advantages of the two processes. The correction unit 12 outputs the corrected target frame image to the generation unit 13.

The below will describe the operation of the image processing device 1 according to the second embodiment. The operation of the image processing device 1 is different in the temporal correction process S16 from the operation (FIG. 3) of the image processing device 1 according to the first embodiment. The following will describe the temporal correction process S16 only.

Figure 12:
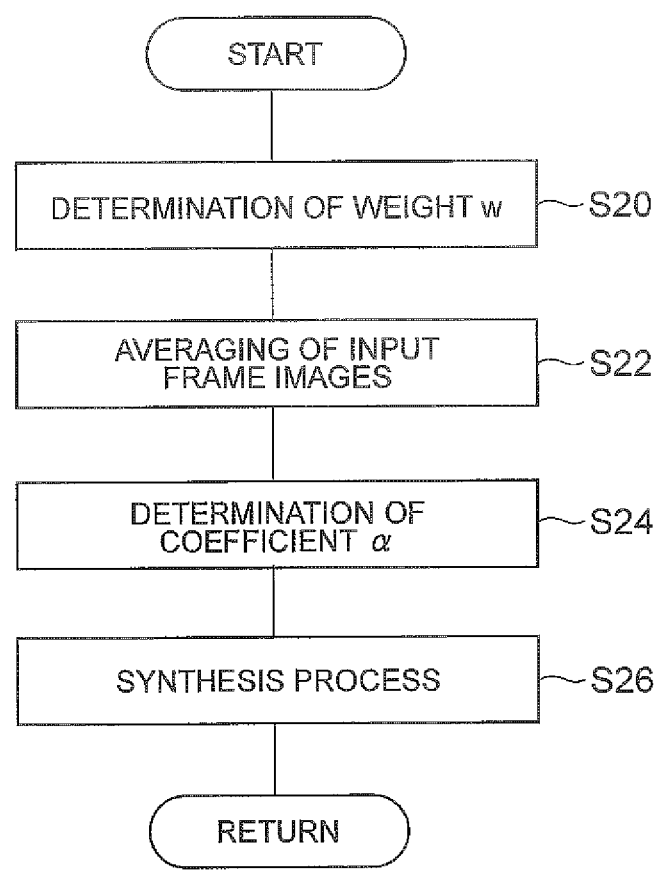
FIG. 12 is a flowchart showing details of the temporal correction process of the image processing device according to the second embodiment.

FIG. 12 is a flowchart showing the details of the temporal correction process S16 in the image processing device 1 according to the second embodiment. As shown in FIG. 12, the correction unit 12 first determines the weight $w_j$ on the target frame image frame$^i\_{In}$ and the previous frame image frame$^j\_{In}$ temporally close to the target frame image frame$^i\_{In}$, which is to be used in the calculation of the weighted average $I_{wave}$ (S20). In the process of S20, for example, the correction unit 12 dynamically calculates the weight $w_j$, depending upon a difference between the pixel value $I^i\_{In}$ of the target pixel $P^i\_{In}$ of the target frame image frame$^i\_{In}$ and the pixel value $I^j\_{In}$ of the corresponding pixel $P^j\_{In}$ of the previous frame image frame$^j\_{In}$ temporally close to the target frame image frame$^i\_{In}$. After completion of the process of S20, the flow moves to an average calculation process of input frame images (S22).

In the process of S22, the correction unit 12 calculates the first term of the aforementioned Formula (1), using the weight $w_j$ determined in S20. Namely, the correction unit 12 calculates the weighted average $I_{wave}$ of the pixel value $I^i\_{In}$ of the target pixel $P^i\_{In}$ of the target frame image frame$^i\_{In}$ and the pixel value of the corresponding pixel $P^j\_{In}$ of the previous frame image frame$^j\_{In}$ temporally close to the target frame image frame$^i\_{In}$. After completion of the process of S22, the flow moves to a determination process of the coefficient α (S24).

In the process of S24, for example, the correction unit 12 dynamically calculates the coefficient α, depending upon a difference between the pixel value $I^{i-1}\_{Out}$ of the corresponding pixel $P^{i-1}\_{Out}$ of the output frame image frame$^{i-1}\_{Out}$ for the previous frame image frame$^{i-1}\_{In}$, and the weighted average $I_{wave}$. After completion of the process of S24, the flow moves to a synthesis process (S26).

In the process of S26, the correction unit 12 calculates the aforementioned Formula (1), using the pixel value $I^{i-1}\_{Out}$ of the corresponding pixel $P^{i-1}\_{Out}$ of the output frame image frame$^{i-1}\_{Out}$ for the out aligned previous frame image frame$^{i-1}\_{In}$, the weighted average $I_{wave}$, and the coefficient α determined in S24.

The above completes the temporal correction process for one target pixel $P^i\_{In}$. The above sequential processing is repetitively carried out for each of target pixels $P^i\_{In}$. After completion of the process of S16, the flow moves to the output frame image generation process (S18).

The below will describe the operational effect of the image processing device 1 according to the second embodiment, as compared with the image processing device using the cyclic filter. The image processing device of a comparative example is assumed to perform the temporal correction process, for example, using the cyclic filter represented by Formula (2). Namely, the image processing device of the comparative example performs the temporal correction process for a target pixel, using the pixel value of the target pixel of the target frame image and the pixel value of the corresponding pixel of the output frame image from the previous frame image that is one frame before the target frame image.

[Math 2]

$$I^i\_{Out} = I^i\_{In} \times (1-\alpha) + I^{i-1}\_{Out} \times \alpha \qquad (2)$$

Figure 13:
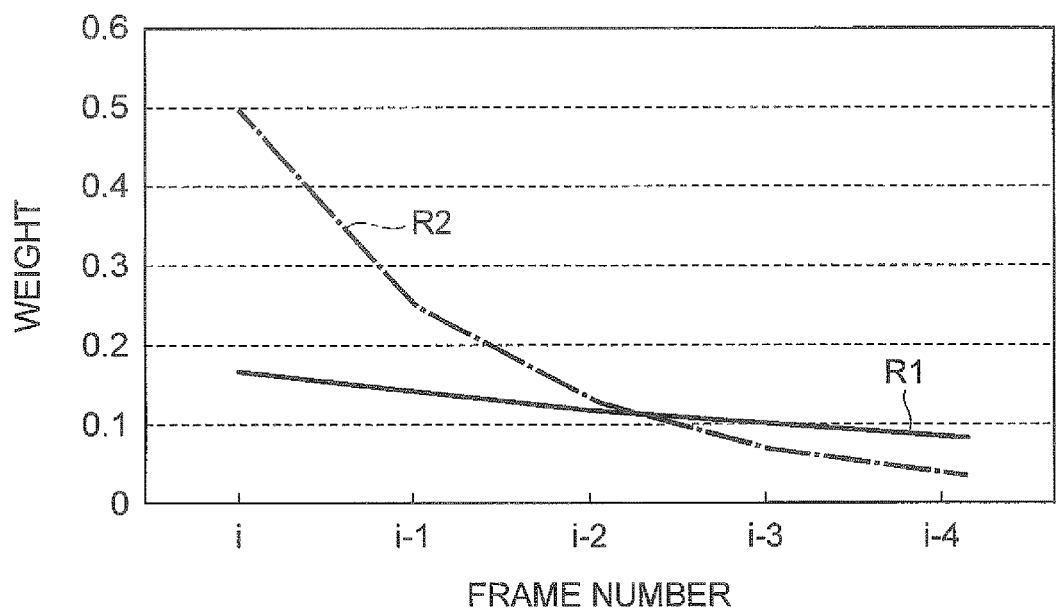
FIG. 13 is a drawing showing an example of weights on input frame images with use of a cyclic filter.

FIG. 13 is a drawing showing an example of weights on the input frame images with use of the cyclic filter. In FIG. 13, graph R1 indicates the weights on the input frame images in the case where the coefficient α is set large and graph R2 indicates the weights on the input frame images in the case where the coefficient α is set small. As indicated by graph R1, the averaging effect of input frame images can be more enhanced as the coefficient α becomes larger; however, influence of input frame images becomes greater, resulting in increase in ghost. As indicated by graph R2, the influence of input frame images becomes smaller as the coefficient α becomes smaller; thus, it can suppress the ghost but the averaging effect of input frame images becomes weakened.

On the other hand, as shown in FIG. 10, the image processing device 1 of the second embodiment is configured as follows: the weights on the pixel values of the corresponding pixels of the input frame images are set so as to decrease toward older input frame images; the weights on the pixel values of the corresponding pixels of the previous frame images of the predetermined number of frames before the target frame image are set so that the difference from the weight on the pixel value of the corresponding pixel of the previous frame image that is one frame after a given previous frame image or the weight on the pixel value of the target pixel is smaller than the difference between the weight on the pixel value of the corresponding pixel of the previous frame image that is the predetermined number of frames ahead of the target frame image and the weight on the pixel value of the corresponding pixel of the previous frame image that is one frame before the previous frame image that is the predetermined number of frames ahead of the target frame image. For this reason, while the weights on the input frame images are kept at certain low levels, the weights on the previous frame images of the predetermined number of frames before the target frame can be nearly equal to the weight on the target frame. When the weights on the input frame images are kept at the certain low levels, the ghost can be reduced. When the weights on the previous frame images of the predetermined number of frames before the target frame are set nearly equal to the weight on the target frame, the averaging effect can be achieved. As a result, it becomes possible to remove the large-amplitude noise such as the flicker, without appearance of the ghost.

The image processing device 1 calculates the weighted average by directly weighting the pixel values of the corresponding pixels of the n input frame images including the target frame image, and performs the temporal correction process for a target pixel, using the weighted average and the pixel value of the corresponding pixel of the output frame image from the previous frame image that is one frame before the target frame image. For this reason, it is sufficient for the device to record only the n input frame images and the output frame image. Therefore, when the number of input frame images to be used in the calculation of the weighted average is suitably set, it is possible to reduce the number of input frame images to be recorded, and to reduce the amount of throughput. This can achieve the resource saving and processing efficiency improvement.

The above-described embodiments show one example of the image processing device according to the present invention. The image processing device according to the present invention does not have to be limited to the image processing devices 1 according to the embodiments, and the image processing devices of the embodiments may be modified or applied to others, without changing the spirit and scope described in each of claims.

For example, the above embodiments illustrated the examples in which the video camera 20 took the video, but the video camera 20 may be a camera configured to capture continuous still images. The images received by the frame image input unit 10 may be images transmitted via a network from another device.

The above embodiments were described on the assumption that the images captured by the video camera 20 had the same size, but the sizes of the captured images may be different shot by shot.

The foregoing embodiments illustrated the examples in which the correction unit 12 performed the two correction processes, the temporal correction process and spatial correction process, but the correction unit 12 may also be configured to perform either one of the temporal correction process and the spatial correction process.

The above embodiments illustrated the examples in which the correction unit 12 performed the spatial correction process (S14) after the alignment process (S12) in the processing of FIG. 3, but the spatial correction process (S14) may be performed before the alignment process (S12) or after the temporal correction process (S16).

In the above embodiments, the device may be configured as follows: the generation unit 13 determines the clipping region, after the alignment process part, and thereafter the correction unit 12 performs the noise removal. In this case, the correction unit 12 may perform the correction for at least pixels in the clipping region as target. Namely, the correction unit 12 does not have to handle each pixel included in at least a part of a region different from the region of the target frame image, as the processing target. In this case, processing efficiency can be improved.

The correction in the spatial correction process in the above embodiments may be one for color-difference component only. The correction in the temporal correction process in the above embodiments may be one for color-difference component only. Degrees of the corrections may be adjusted by placing respective weights on the temporal correction process and on the spatial correction process.

The correction unit 12 according to the second embodiment may be configured to perform the temporal correction process using a noncyclic filter. Namely, the correction unit 12 may perform the temporal correction process for a target pixel, while directly weighting the pixel values of the corresponding pixels of the input frame images (the pixel value of the target pixel of the target frame image and the pixel values of the corresponding pixels of a plurality of previous frame images). The temporal correction process using the noncyclic filter is expressed by Formula (3), using the pixel value $I^i_{In}$ of the pixel $P^j_{In}$ of the j-th input frame image frame$^j_{In}$, the pixel value $I^i_{Out}$ of the pixel $P^j_{Out}$ after the correction of the pixel $P^i_{In}$, and the weight $w_j$ on each pixel value $I^j_{In}$. Here, pixels of m input frame images including the pixel $P^i_{In}$ are used. Since this method directly uses the plurality of frame images, there are possibilities of increase in capacity of buffer and increase in processing time, but it becomes possible to directly weight each of pixel values of the input frame images. For this reason, it is possible to increase degrees of freedom of the temporal correction process, e.g., to reduce the influence of pixel values of pixels including a moving subject.

[Math 3]

$$I^i_{Out} = \sum_{j=i-m+1}^{i} I^j_{In} \times w_j \qquad (3)$$

The correction unit 12 according to the second embodiment may also be equipped with the correction filter (first correction filter) represented by Formula (2), in addition to the correction filter for removal of flicker (second correction filter) represented by Formula (1), Formula (3) or the like. The correction unit 12 may perform the temporal correction process for a target pixel, while switching between the first correction filter and the second correction filter, depending upon the target pixel. For example, the image processing device 1 has a flicker removal mode that can be set by a user of the portable terminal 2; when the flicker removal mode is not set, the correction unit 12 may perform the temporal correction process using the first correction filter; when the flicker removal mode is set, the correction unit 12 may perform the temporal correction process using the second correction filter. The image processing device 1 may be further provided with a flicker determination unit for determining whether a flicker is present or not; when the flicker determination unit determines that there is no flicker, the correction unit 12 may perform the temporal correction process using the first correction filter; when the flicker determination unit determines that there is a flicker, the correction unit 12 may perform the temporal correction process using the second correction filter. The flicker determination unit determines the presence or absence of the flicker by use of a known flicker determination method. The flicker determination unit makes the determination, for example, as follows: when a temporal change amount of pixel values of a pixel is not less than a predetermined threshold, it determines that there is a flicker in the pixel; when the temporal change amount of pixel values of a pixel is less than the predetermined threshold, it determines that there is no flicker in the pixel. This configuration makes it possible to select the proper correction filter according to a target pixel.

REFERENCE SIGNS LIST 1 image processing device; 10 frame image input unit; 11 alignment unit; 12 correction unit; 13 generation unit; 14 output frame image recording unit; 20 video camera (imaging device).

The invention claimed is:

1. An image processing device for receiving and processing an input frame image captured by an imaging device to generate an output frame image, comprising:
a processor; and
a memory storing instructions executable by the processor,
wherein the processor is configured to:
record, in a storage, a recorded frame image comprising one of:
a previous input frame image that was input before a current input frame image that is to be a processing target; or
a previous output frame image generated from the previous input frame image;
align the current input frame image with the recorded frame image;
calculate a weighted average using a correction filter, wherein the weighted average is calculated by directly weighting a pixel value of a target pixel of the current input frame image and directly weighting pixel values of corresponding pixels of at least one of a plurality of previous input frame images that are a predetermined number of frames before the current input frame image;
perform a temporal correction process to correct the target pixel by using the weighted average and a pixel value of a corresponding pixel of one previous output frame image generated from any one of the plurality of previous input frame images; and
generate a current output frame image from the current input frame image by use of the current input frame image corrected by the temporal correction process,
wherein in the correction filter, weights on the pixel values of the corresponding pixels of the previous input frame images are set to decrease toward older previous input frame images, and
wherein in the correction filter, the weights on the pixel values of the corresponding pixels of the plurality of previous input frame images of the predetermined number of frames are set so that a difference from the weight on the pixel value of the corresponding pixel of the previous input frame image that is one frame after a given previous input frame image or from the weight on the pixel value of the target pixel is smaller than a difference between the weight on the pixel value of the corresponding pixel of the previous input frame image that is the predetermined number of frames ahead of the current input frame image and the weight on the pixel value of the corresponding pixel of the previous input frame image that is one frame before the previous input frame image that is the predetermined number of frames ahead of the current input frame image.

2. The image processing device according to claim 1, wherein the processor is further configured to perform a spatial correction process to correct a pixel value of a pixel of the current input frame image by use of pixel values of a plurality of pixels included in a region including the aforementioned pixel in the current input frame image.

3. The image processing device according to claim 1, wherein the processor is further configured to perform the temporal correction process for the target pixel, using a coefficient according to a difference between a pixel value of the target pixel of the current input frame image and a pixel value of a corresponding pixel of the previous input frame image or the pixel value of the corresponding pixel of the previous output frame image from the previous frame image that has been aligned by the alignment.

4. The image processing device according to claim 1, wherein the processor is further configured to store the current output frame image in the storage.

5. The image processing device according to claim 1, wherein the processor is further configured to determine a clipping region from the current input frame image corrected by the temporal correction process based on a motion of the imaging device, and clips the clipping region, thereby generating the current output frame image.

6. The image processing device according to claim 5, wherein the processor is further configured to exclude a pixel from the processing target, the pixel being included in at least a part of a region different from the clipping region of the current input frame image.

7. The image processing device according to claim 1, wherein the processor is further configured, using another correction filter, to perform the temporal correction process for the target pixel, using the pixel value of the target pixel of the current input frame image and the pixel value of the corresponding pixel of the previous output frame image and to perform the temporal correction process for the target pixel, while switching between the correction filter and the another correction filter, according to the target pixel.

8. An image processing method for receiving and processing an input frame image captured by an imaging device to generate an output frame image, comprising:
- aligning a previous input frame image that was input before a current input frame image that is to be a processing target or a previous output frame image generated from the previous input frame image with the current input frame image;
- calculating a weighted average using a correction filter, wherein the weighted average is calculated by directly weighting a pixel value of a target pixel of the current input frame image and directly weighting pixel values of corresponding pixels of at least one of a plurality of previous input frame images that are a predetermined number of frames before the current input frame image;
- performing a temporal correction process to correct the target pixel by using the weighted average and a pixel value of a corresponding pixel of one previous output frame image generated from any one of the plurality of previous input frame images; and
- generating a current output frame image from the current input frame image by use of the current input frame image corrected by the temporal correction process,
- wherein in the correction filter, weights on the pixel values of the corresponding pixels of the previous input frame images are set to decrease toward older previous input frame images, and
- wherein in the correction filter, the weights on the pixel values of the corresponding pixels of the plurality of previous input frame images of the predetermined number of frames are set so that a difference from the weight on the pixel value of the corresponding pixel of the previous input frame image that is one frame after a given previous input frame image or from the weight on the pixel value of the target pixel is smaller than a difference between the weight on the pixel value of the corresponding pixel of the previous input frame image that is the predetermined number of frames ahead of the current input frame image and the weight on the pixel value of the corresponding pixel of the previous input frame image that is one frame before the previous input frame image that is the predetermined number of frames ahead of the current input frame image.

9. A non-transitory computer-readable recording medium storing an image processing program for letting a computer perform an image processing method to receive and process an input frame image captured by an imaging device to generate an output frame image, the image processing program letting the computer perform the image processing method comprising:
- recording, in a storage, a recorded frame image comprising one of:
  - a previous input frame image that was input before a current input frame image that is to be a processing target; or
  - a previous output frame image generated from the previous input frame image;
- aligning the current input frame image with the recorded frame image;
- calculating a weighted average using a correction filter, wherein the weighted average is calculated by directly weighting a pixel value of a target pixel of the current input frame image and directly weighting pixel values of corresponding pixels of at least one of a plurality of previous input frame images that are a predetermined number of frames before the current input frame image;
- performing a temporal correction process to correct the target pixel by using the weighted average and a pixel value of a corresponding pixel of one previous output frame image generated from any one of the plurality of previous input frame images; and
- generating a current output frame image from the current input frame image by use of the current input frame image corrected by the temporal correction process,
- wherein in the correction filter, weights on the pixel values of the corresponding pixels of the previous input frame images are set to decrease toward older previous input frame images, and
- wherein in the correction filter, the weights on the pixel values of the corresponding pixels of the plurality of previous input frame images of the predetermined number of frames are set so that a difference from the weight on the pixel value of the corresponding pixel of the previous input frame image that is one frame after a given previous input frame image or from the weight on the pixel value of the target pixel is smaller than a difference between the weight on the pixel value of the corresponding pixel of the previous input frame image that is the predetermined number of frames ahead of the current input frame image and the weight on the pixel value of the corresponding pixel of the previous input frame image that is one frame before the previous input frame image that is the predetermined number of frames ahead of the current input frame image.

10. The image processing device according to claim 2, wherein the processor is further configured to perform the temporal correction process for the target pixel, using a coefficient according to a difference between a pixel value of the target pixel of the current input frame image and a pixel value of a corresponding pixel of the previous input frame image or the pixel value of the corresponding pixel of the previous output frame image from the previous frame image that has been aligned by the alignment.

11. The image processing device according to claim 2, wherein the processor is further configured to store the current output frame image in the storage.

12. The image processing device according to claim 3, wherein the processor is further configured to store the current output frame image in the storage.

13. The image processing device according to claim 10, wherein the processor is further configured to store the current output frame image in the storage.

14. The image processing device according to claim 2, wherein the processor is further configured to determine a clipping region from the current input frame image corrected by the temporal correction process based on a motion of the imaging device, and clip the clipping region, thereby generating the current output frame image.

15. The image processing device according to claim 3, wherein the processor is further configured to determine a clipping region from the current input frame image corrected by the temporal correction process based on a motion of the imaging device, and clip the clipping region, thereby generating the current output frame image.

16. The image processing device according to claim 4, wherein the processor is further configured to determine a clipping region from the current input frame image corrected by the temporal correction process based on a motion of the imaging device, and clip the clipping region, thereby generating the current output frame image.

17. The image processing device according to claim 10, wherein the processor is further configured to determine a clipping region from the current input frame image corrected by the temporal correction process based on a motion of the imaging device, and clip the clipping region, thereby generating the current output frame image.

* * * * *